(12) United States Patent
Hwang

(10) Patent No.: US 10,112,621 B2
(45) Date of Patent: Oct. 30, 2018

(54) WEARABLE DEVICE, VEHICLE FOR COMMUNICATING WITH THE WEARABLE DEVICE

(71) Applicant: HYUNDAI MOTOR COMPANY, Seoul (KR)

(72) Inventor: Junsik Hwang, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 84 days.

(21) Appl. No.: 15/343,290

(22) Filed: Nov. 4, 2016

(65) Prior Publication Data

US 2017/0369075 A1 Dec. 28, 2017

(30) Foreign Application Priority Data

Jun. 23, 2016 (KR) .................. 10-2016-0078358

(51) Int. Cl.
*B60W 50/16* (2012.01)
*B60W 50/08* (2012.01)
(Continued)

(52) U.S. Cl.
CPC ......... *B60W 50/082* (2013.01); *B60K 28/066* (2013.01); *B60W 40/08* (2013.01);
(Continued)

(58) Field of Classification Search
CPC .... B60W 50/082; B60W 40/08; B60W 50/14; B60W 50/16; B60W 2040/0827;
(Continued)

(56) References Cited

U.S. PATENT DOCUMENTS

2015/0314681 A1 11/2015 Riley, Sr. et al.
2015/0328985 A1* 11/2015 Kim .................. H04N 5/23229
 180/272
(Continued)

FOREIGN PATENT DOCUMENTS

JP 2011-248850 A 12/2011
JP 2014-094708 A 5/2014
(Continued)

OTHER PUBLICATIONS

Wei et al., Multi-source information fusion for drowsy driving detection based on wireless sensor networks, 20103, IEEE, p. 850-857 (Year: 2013).*

(Continued)

*Primary Examiner* — McDieunel Marc
(74) *Attorney, Agent, or Firm* — McDermott Will & Emery LLP

(57) ABSTRACT

A wearable device includes a communicator for performing a communication with a vehicle, a detector for detecting a user's biological information, and a controller for performing a power save mode when vehicle speed information is received via the communicator, for converting the power save mode into a normal mode when first determination information of drowsy driving is received via the communicator during the power save mode, and for secondly determining whether current driving is a drowsy driving based on the detected biological information during the normal mode.

12 Claims, 9 Drawing Sheets

(51) Int. Cl.
*B60W 40/08* (2012.01)
*B60W 50/14* (2012.01)
*B60K 28/06* (2006.01)

(52) U.S. Cl.
CPC ............ *B60W 50/14* (2013.01); *B60W 50/16* (2013.01); *B60W 2040/0827* (2013.01); *B60W 2050/143* (2013.01); *B60W 2050/146* (2013.01); *B60W 2520/10* (2013.01); *B60W 2540/26* (2013.01)

(58) Field of Classification Search
CPC ...... B60W 2050/143; B60W 2050/146; G05D 1/0061; A61B 5/0205; A61B 5/0059; A61B 5/0402; A61B 5/0476; A61B 5/0488; A61B 5/14532; A61B 5/04001; A61B 5/14552; A61B 5/18
See application file for complete search history.

(56) References Cited

U.S. PATENT DOCUMENTS

| | | | | |
|---|---|---|---|---|
| 2015/0351681 | A1* | 12/2015 | Lee | A61B 5/4806 600/595 |
| 2016/0046294 | A1* | 2/2016 | Lee | B60W 40/08 340/576 |
| 2017/0090475 | A1* | 3/2017 | Choi | A61B 5/0059 |

FOREIGN PATENT DOCUMENTS

| | | |
|---|---|---|
| JP | 2014-102539 A | 6/2014 |
| KR | 20000017475 U | 9/2000 |
| KR | 10-2009-0022909 | 3/2009 |
| KR | 10-2013-0029985 | 3/2013 |
| KR | 10-2015-0043663 | 4/2015 |
| KR | 10-2015-0076797 A | 7/2015 |
| KR | 10-1575051 B1 | 12/2015 |

OTHER PUBLICATIONS

Hossan et al., A smart system for driver's fatigue detection, remote notification and semi-automatic parking of vehicles to prevent road accidents, 2016, IEEE, p. 1-6 (Year: 2017).*
Rusmin et al., Design and implementation of driver drowsiness detection system on digitalized driver system, 2013, IEEE, p. 375-380 (Year: 2013).*
Li et al., Smartwatch-Based Wearable EEG System for Driver Drowsiness Detection, 2015, IEEE, p. 7169-7180 (Year: 2015).*
Rogado et al., Driver fatigue detection system, 2008, IEEE, p. 1105-1110 (Year: 2008).*
Mashko, Review of approaches to the problem of driver fatigue and drowsiness, 2015, IEEE, p. 1-5 (Year: 2015).*
Ke et al., Drowsiness Detection System Using Heartbeat Rate in Android-Based Handheld Devices, 2016, IEEE, p. 99-103 (Year: 2016).*
Warwick et al., Detecting Driver Drowsiness Using Wireless Wearables, 2015, IEEE, p. 585-588 (Year: 2016).*
Hossan et al., A Smart System for Driver's Fatigue Detection, Remote Notification and Semi-Automatic Parking of Vehicles to Prevent Road Accidents, 2016, IEEE, p. 1-6 (Year: 2016).*

* cited by examiner

WEARABLE DEVICE, VEHICLE FOR COMMUNICATING WITH THE WEARABLE DEVICE

CROSS-REFERENCE TO RELATED APPLICATION

This application claims the benefit of priority to Korean Patent Application No. 10-2016-0078358, filed on Jun. 23, 2016 with the Korean Intellectual Property Office, the disclosure of which is incorporated herein by reference.

TECHNICAL FIELD

Embodiments of the present disclosure relate to a wearable device configured to prevent drowsy driving, a vehicle for communicating with the wearable device.

BACKGROUND

A vehicle is an apparatus configured to travel by driving a wheel to transport a person or a cargo, and the vehicle drives on a road.

When a driver drives the vehicle in the city, there may be less of a concern of drowsy driving since a driving pattern in the city is often varied. However, when a driver drives on a monotonous route, e.g. a highway or a national highway for a long time, drowsy driving may result since the driver loses focus.

In order to prevent a driver from driving while drowsy, a technology has been developed to measure and analyze various kind of biological information of which the driver is not continuously and consciously aware, to determine whether the driver has become drowsy, and to warn the drowsy driver when the driver has fallen into a drowsy state.

However, in a conventional drowsy driving detection method, there may be an inconvenience in acquiring a biological signal by mounting a sensor to a driver's body. Thus, an alternate detection method is needed.

SUMMARY

Therefore, it is an aspect of the present disclosure to provide a vehicle capable of transmitting first information related to a drowsy driving to a wearable device and outputting notification information when receiving second information related to the drowsy driving from the wearable device and a method for controlling the vehicle.

It is another aspect of the present disclosure to provide a wearable device capable of firstly determining whether current driving is a drowsy driving by using a first sensor after activating the first sensor by performing a power saving mode during a vehicle drives, capable of activating a second sensor by performing a normal mode when it is determined to be the drowsy driving, and capable of secondly determining whether current driving is a drowsy driving by using the second sensor, and a method for controlling the wearable device.

Additional aspects of the present disclosure will be set forth in part in the description which follows and, in part, will be obvious from the description, or may be learned by practice of the present disclosure.

In accordance with an aspect of the present disclosure, a wearable device comprises: a communicator configured to perform a communication with a vehicle; a detector configured to detect user's biological information; and a controller configured to perform a power save mode when vehicle speed information is received via the communicator, configure to convert the power save mode into a normal mode when first determination information of drowsy driving is received via the communicator during the power save mode, and configured to secondly determine whether current driving is a drowsy driving based on the detected biological information during the normal mode.

The wearable device further comprises: an output unit configured to output notification information related to a drowsy driving when it is secondly determined that current driving is a drowsy driving.

The output unit comprises a display configured to output the notification information as an image, and a vibrator configured to generate a vibration when it is secondly determined that current driving is a drowsy driving.

The wearable device further comprises: a power supplier configured to supply a power to the communicator, the detector, the controller and the output unit, wherein, during the power save mode, the controller controls the power supplier so that the power supplier supplies the power to the communicator and the controller, and during the normal mode, the controller controls the power supplier so that the power supplier supplies the power to the communicator, the detector, the controller and the output unit.

When it is secondly determined that current driving is a drowsy driving, the controller allows second determination information of drowsy driving to be transmitted to the vehicle.

In accordance with another aspect of the present disclosure, a wearable device comprises: a first sensor configured to detect user arm's movement information; a second sensor configured to detect user's biological response information; a controller configured to determine whether a vehicle drives or not based on movement information detected by the first sensor, configured to perform a power save mode when it is determined that the vehicle drives, configured to firstly determine whether current driving is a drowsy driving based on movement information detected by the first sensor during the power save mode, configured to convert the power save mode into a normal mode when it is firstly determined that current driving is a drowsy driving, configured to secondly determine whether current driving is a drowsy driving based on biological response information detected by the second sensor during the normal mode, and configured to control outputting notification information when it is secondly determined that current driving is a drowsy driving; and an output unit configured to output the notification information.

The output unit comprises a display configured to output the notification information as an image, a sound device configured to output the notification information as a sound, and a vibrator configured to generate a vibration when it is secondly determined that current driving is a drowsy driving.

The wearable device further comprises: a power supplier configured to supply a power to the first sensor, the second sensor, the controller and the output unit, wherein during the power save mode, the controller controls the power supplier so that the power supplier supplies the power to the first sensor and the controller, and during the normal mode, the controller controls the power supplier so that the power supplier supplies the power to the first sensor, the second sensor, the controller and the output unit.

The wearable device further comprises: a storage configured to store movement information to determine whether the vehicle drives and movement information to determine whether current driving is a drowsy driving.

In accordance with another aspect of the present disclosure, a vehicle comprises: a communicator configured to perform a communication with a wearable device and a navigation system; a detector configured to detect operation information of a steering wheel; and a controller configured to firstly determine whether current driving is a drowsy driving based on the operation information detected by the detector when it is determined that a current position is a highway based on information transmitted from the navigation system, and configured to allow first determination information of drowsy driving to be transmitted to the wearable device when it is firstly determined that current driving is a drowsy driving.

The vehicle further comprises: a display configured to output notification information, wherein the controller controls outputting the notification information when second information of drowsy driving is received from the wearable device.

The vehicle further comprises: a lane departure warning system configured to recognize a lane departure, wherein the controller detects whether the vehicle is away from the lane or not when firstly determining whether current driving is a drowsy driving, configured to firstly determine that current driving is a drowsy driving when the vehicle is placed in a lane line adjacent to the lane of the vehicle, and configured to determine that current driving is not drowsy driving when the vehicle is placed in the lane of the vehicle.

The operation information comprises a pressure applied to the steering wheel and a rotation angle of the steering wheel, wherein the controller firstly determines that current driving is a drowsy driving when the pressure applied to the steering wheel is less than a reference pressure and the rotation angle of the steering wheel is less than a reference angle.

The detector further detects a driving speed, wherein the controller allows the detected driving speed information to be transmitted to the wearable device.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

The present disclosure will be described more fully hereinafter with reference to the accompanying drawings, in which exemplary embodiments of the disclosure are shown.

Figure 1:
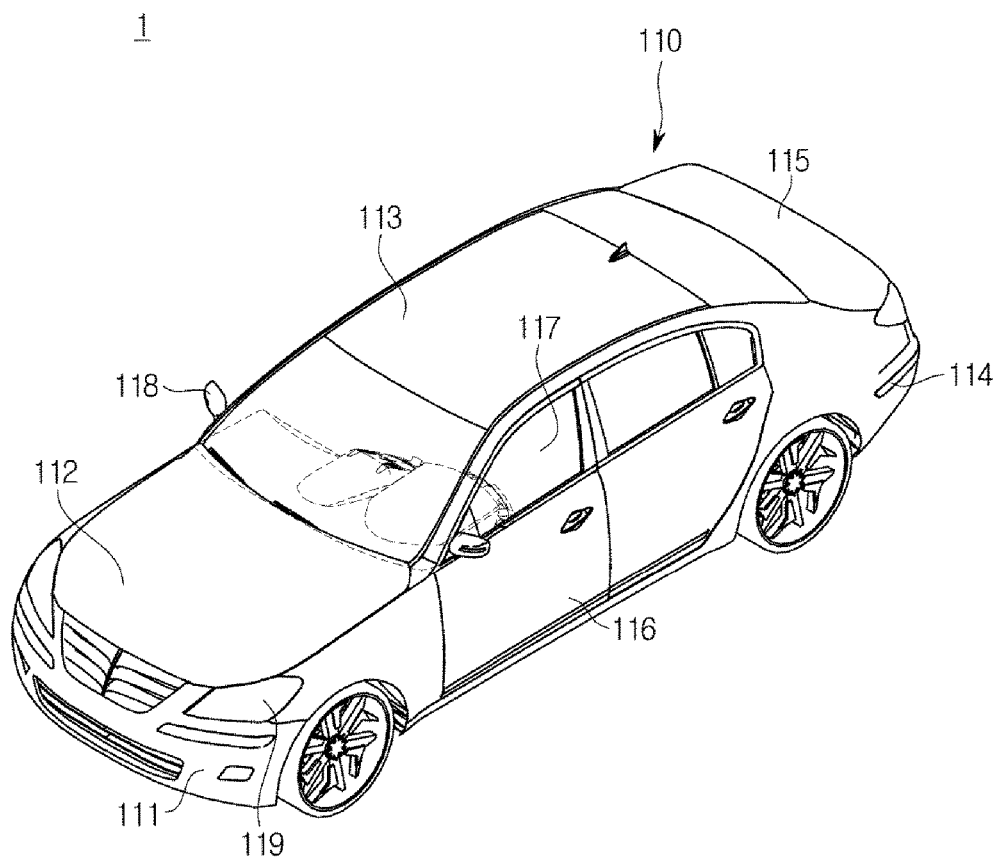
FIG. 1 is a view illustrating an exterior of a vehicle communicating with a wearable device in accordance with an embodiment of the present disclosure.
Figure 2:
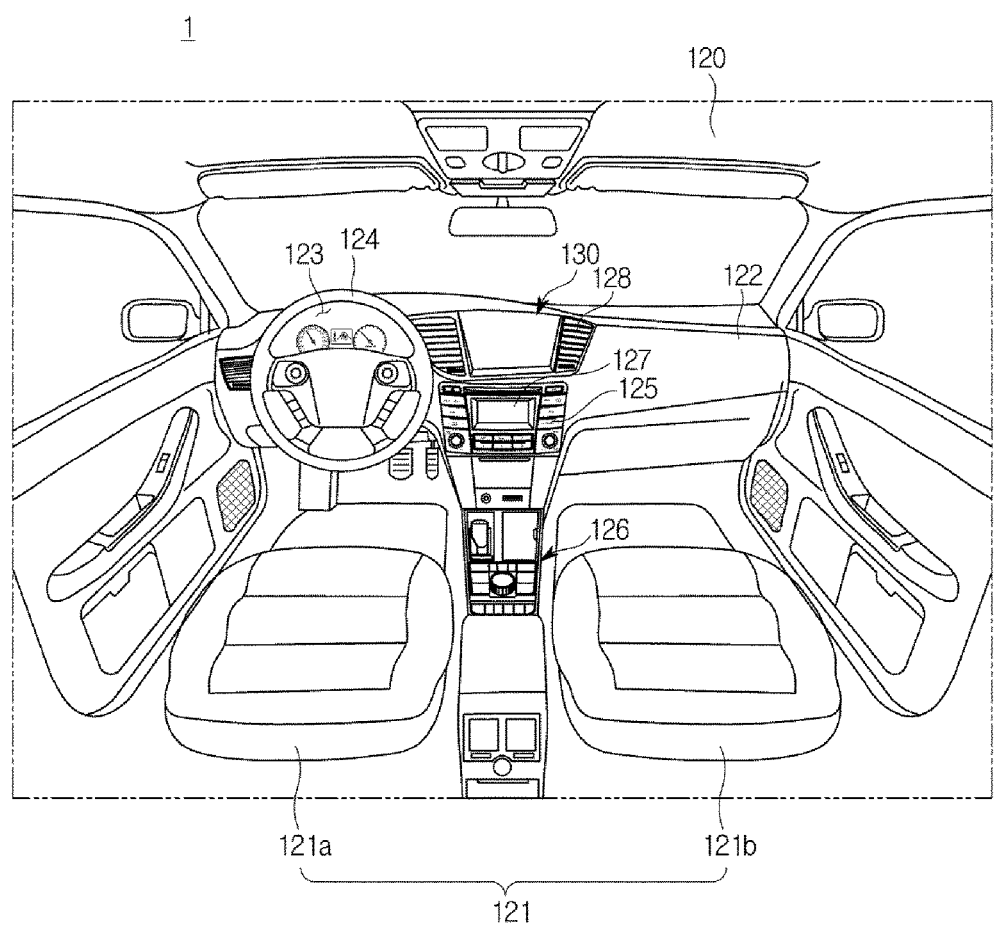
FIG. 2 is a view illustrating an interior of the vehicle of FIG. 1.
Figure 3:
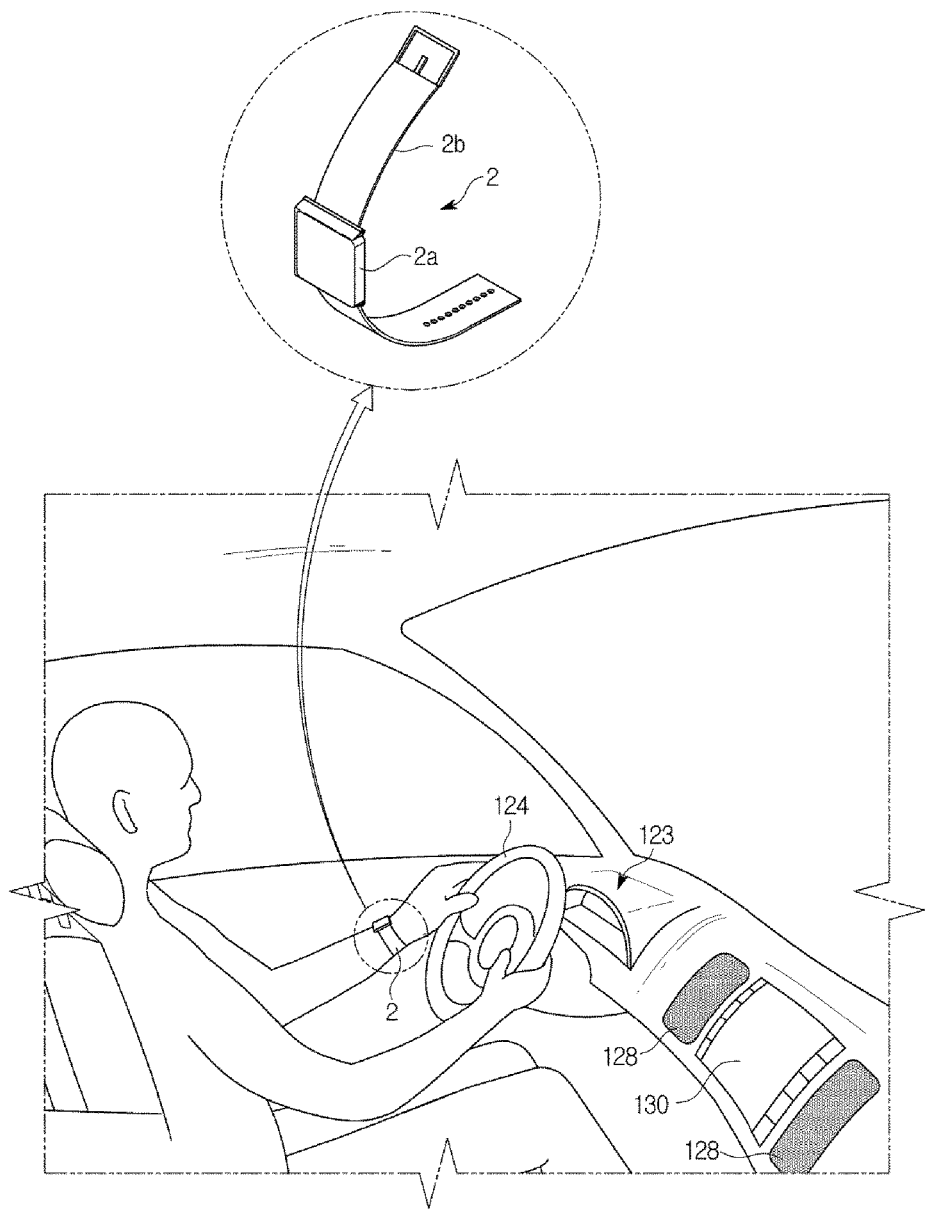
FIG. 3 is a view illustrating a wearable device that is worn by a driver of a vehicle of FIG. 1 according to embodiments of the present disclosure.

FIG. 1 is a view illustrating an exterior of a vehicle communicating with a wearable device in accordance with an embodiment of the present disclosure, FIG. 2 is a view illustrating an interior of a vehicle of FIG. 1, and FIG. 3 is a view illustrating a wearable device that is worn by a driver of a vehicle of FIG. 1.

A vehicle 1 is an apparatus configured to drive by driving a wheel to transport a person or a cargo, and the vehicle is moved on the road.

The vehicle 1 may include a body having an exterior and an interior, and a chassis that is the remaining part except for the body, and in which a mechanical device for a driving is installed.

As illustrated in FIG. 1, the exterior 110 of the body may include a front panel 111, a bonnet 112, a roof panel 113, a rear panel 114, a trunk 115, and a front, rear, left and right door 116.

The exterior of the body may further include the front panel 111, the bonnet 112, the roof panel 113, the rear panel 114, the trunk 115, the front, rear, left and right door 116, a window glass provided in the front, rear, left and right door 116, and a pillar provided in a boundary among the front, rear, left and right window glass 117.

The window glass installed in the front, rear, left and right door 116 may further include a side window glass, a quarter window glass installed between the pillars to be unopenable, a rear window glass installed in the rear side, and a front window glass installed in the front side.

The exterior of the body may further include a side mirror 118 configured to provide a rear view of the vehicle 1 to a driver.

The exterior of the body may further include a lamp unit 119 provided in the front side and the rear side, and configured to perform a function of a signal and communication for another vehicle and a pedestrian, as well as configured to perform a light function to allow the driver to easily recognize all kinds of information of, and around, the vehicle while the driver watches the front view.

The lamp unit 119 may further include a high beam lamp, a low beam lamp, an emergency lamp, a fog lamp, a turn signal lamp, a side marker light demarcating the width of the vehicle, a brake light warning other vehicle in the rear side about a brake when a driver steps on a brake pedal and a back-up light warning other vehicles or a pedestrian in the rear side when the vehicle moves in reverse.

As illustrated in FIG. 2, the interior 120 of the body may include a seat (121; 121a and 121b) on which a passenger is seated, a dashboard 122, an instrument panel 123, i.e. a cluster, a steering wheel 124 to change the direction of the vehicle, and a center fascia 125 provided between the driver seat 121a and the passenger seat 121b in the dashboard 122, and in which an operation panel of an audio device and an air conditioning device is installed, wherein the instrument panel 123 may be disposed on the dashboard and may include tachometer, speedometer, coolant temperature indicator, fuel indicator, indicator of a variety of lamps, warning light, seat belt warning light, trip odometer, odometer, automatic transmission selector lever indicator, door open warning light, oil warning light and a low fuel warning light.

The seat 121 may include the driver seat 121a on which a driver is seated, the passenger seat 121b on which a passenger is seated, and a rear seat provided in the rear side of the inside of the vehicle.

The center fascia 125 may include a head unit configured to control an audio device, an air conditioning device, and a hot-wire in the seat, an air outlet, a cigar jack and a multi-terminal.

The vehicle 1 may further include a first input 126 configured to receive an operation command of a variety of functions.

Particularly, the input 126 may be disposed on the center fascia 125.

The input 126 may include at least one physical button such as an On/Off button for an operation of the variety of functions, and a button to change a set value of the variety of functions.

The input 126 may further include a jog dial (not shown) or a touch pad to input a command for moving cursor and selecting cursor, wherein the cursor is displayed on a vehicle terminal 130.

The vehicle 1 may further include a first display 127 configured to output information related to a navigation function, a DMB function, an audio function, a video function, and a warning function, as an image, and a first sound device 128 configured to output information related to a navigation function, a DMB function, an audio function, a video function, and a warning function as a sound.

The vehicle 1 may further include the vehicle terminal 130 configured to output a result corresponding to information that is input by a user.

The vehicle terminal 130 may perform at least one function of a navigation function, a DMB function, an audio function, a video function and a warning function, perform a communication with an external terminal, and display transmission and reception information with the external terminal.

According to an embodiment of the present disclosure, the vehicle terminal may be a navigation system configured to mainly perform navigation.

The vehicle terminal 130 may be implemented by a touch screen integrally formed by a touch panel and a display panel.

The external terminal may include a laptop, a tablet, a smartphone, a Universal Serial Bus (USB) memory and a wearable device.

The chassis of the vehicle may further include a power system, a power train, a steering system, a brake system, a suspension system, a transmission device, a fuel system, front, rear, left and right vehicle wheels, a variety of safety devices for a driver and passenger safe (an air bag control device and an Electronic Stability Control (ESC) device) and an Electronic Control Unit (ECU) configured to control an operation of thereof.

The vehicle 1 may further include a first detector, e.g. a proximity sensor configured to detect an obstacle or another vehicle placed in the rear side or the lateral side of the vehicle; a rain sensor configured to detect whether there is rain or an amount of rain; a wheel speed sensor configured to detect a speed of the wheel of the vehicle; a lateral acceleration sensor configured to detect a lateral acceleration of the vehicle; a yaw rate sensor and a gyro sensor configured to detect the variation of angular speed of the vehicle; and a steering angle sensor configured to detect a rotation of a steering wheel of the vehicle.

The vehicle 1 may selectively include an electronic device such as a lane departure warning system, a navigation system, a hand-free device, an audio device, a bluetooth device, a rear camera, a device for charging an external terminal, and a high-pass device, which are installed for the convenience of the driver.

The navigation system may be a vehicle terminal embedded in the vehicle or detachably installed in the vehicle.

The vehicle 1 may further include an ignition button configured to input an operation command to an ignition motor (not shown).

That is, when the ignition button is turned on, the vehicle 1 may turn on an ignition motor (not shown) and drive an engine (not shown) that is the power generation device, trough the operation of the ignition motor.

The vehicle 1 may further include a battery (not shown) configured to supply a driving power by being electrically connected to a vehicle terminal, an audio device, an interior lamp, an ignition motor and other electronic devices.

The battery may perform a charging by using a generator or a power from an engine, while the vehicle drives.

The vehicle 1 may further include an antenna apparatus and a receiver configured to receive a plurality of satellite signals. The antenna may be provided in the roof panel 113, and configured to receive a radio signal, a broadcast signal and a satellite signal, and configured to transmit and receive a signal to and from another vehicle, Intelligence Transportation System (ITS) server and a base station.

The vehicle may further include a first communicator configured to perform a communication with at least one of another vehicle, an external server, an external infra and an external terminal.

The first communicator of the vehicle may perform a communication between electronic devices in the vehicle.

The first communicator may further perform a CAN communication, a USB communication, a Wireless Fidelity (WiFi) communication, a bluetooth communication, a broadcasting communication, e.g. TPEG, SXM, RDS, and 2G, 3G, 4G and 5G communication.

The vehicle 1 may perform a communication with a wearable device 2 among external terminals.

As illustrated in FIG. 3, the wearable device 2 may include a variety of devices that are wearable on a user's body or clothing.

The wearable device 2 may include a smart watch, a smart band, a wearable computer, a google glass, a bluetooth headset and a smart wear.

The wearable device 2 may be placed in the inside of the vehicle while being worn on a user's body, and in this time the wearable device 2 may perform a communication with the vehicle 1.

The wearable device 2 may detect a variety of biological status related to a user's body and then determine whether a driver drives while drowsy by using the detected information.

As illustrated in FIG. 3, a watch-type wearable device, i.e. a smart watch 2 may include a body 2a having a user interface, and a band 2b connected to the body 2a to be wearable on a wrist.

The wearable device 2 may perform a wireless communication and output information by using the user interface provided in the front side of the body. The user interface may be implemented by a touch screen.

The band 2b may be formed to surround a wrist by being worn on the wrist, and formed with a flexible material to be easily worn. For example, the band 2b may be formed with leather, rubber, silicon and/or synthetic resin. The band 2b may be detachable to the body 2a, and may be configured to be replaceable with another band in various types according to a user's preference.

The band 2b may include a fastener. The fastener may be implemented by a buckle, a hook structure configured to allow snap-fit or Velcro. A part of the band 2b may have the elasticity or the band 2b may include a material having the elasticity.

The wearable device 2 may ask the vehicle to perform a certain function by performing a wired or wireless communication with the vehicle.

The wearable device 2 may transmit at least one of image information and audio information, which are output from the wearable device 2, to an audio/video (A/V) output device, e.g. a navigation system through the communication.

A control configuration of the vehicle and the wearable device will be described with reference to FIGS. 4 and 5.

In addition, to distinguish a component of the vehicle 1 from a component of the wearable device 2, which have the same name, the component of the vehicle 1 has, or is, "first" and the component of the wearable device 2 has, or is, "second".

Figure 4:
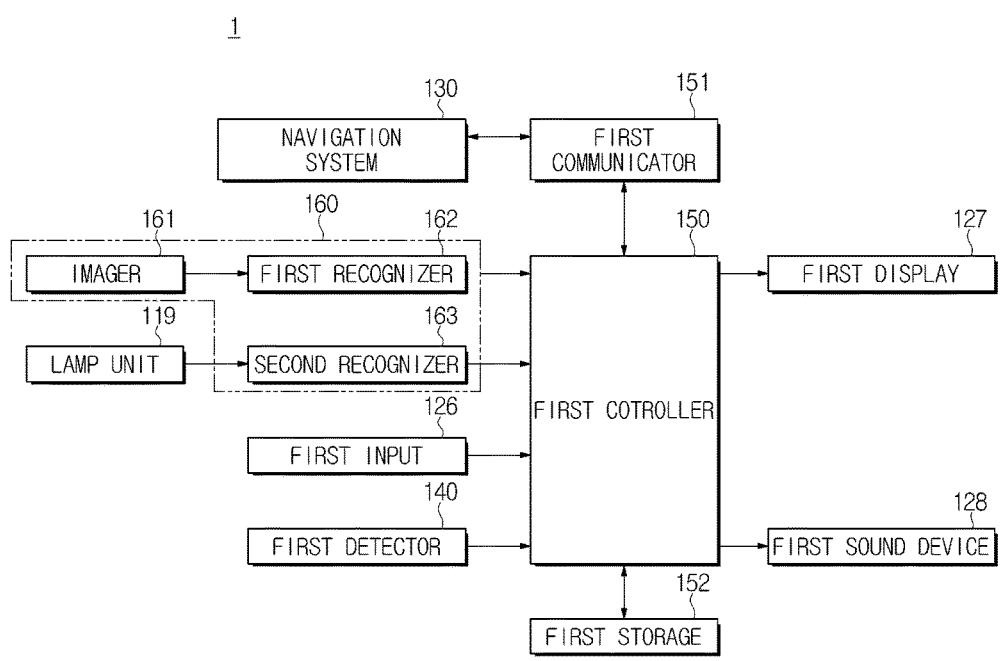
FIG. 4 is a control block diagram illustrating a vehicle communicating with a wearable device in accordance with an embodiment of the present disclosure.

FIG. 4 is a control block diagram illustrating a vehicle communicating with a wearable device in accordance with an embodiment of the present disclosure.

The vehicle may include a lamp unit 119; a first input 126; a first display 127; a first sound device 128; a navigation system 130; a first detector 140; a first controller 150; a first communicator 151; and a first storage 152 and may further include an imager 161, a first recognizer 162 and a second recognizer 163 of a lane departure warning system 160.

The lamp unit 119 may include a turn signal lamp provided in the front, rear, left and right of the vehicle, and a lamp provided in the side mirror.

The turn signal lamp may include a left turn signal lamp provided in the front left side and the rear left side of the vehicle to indicate a movement to the left side, and a right turn signal lamp provided in the front right side and the rear right side of the vehicle to indicate a movement to the right side.

The first input 126 may receive an operation command of at least one function of an audio function, a video function, a navigation function and a radio function, and receive an operation command of a drowsy driving prevention function.

The first input 126 may receive a command for pairing with the wearable device.

The first input 126 configured to receive an operation command of the drowsy driving detection function and pairing command may be one of buttons provided in the head unit or an input button displayed on the vehicle terminal 130.

The first input 126 may receive a selection of notification information related to a drowsy driving from a user.

Based on a command of the first controller 150, the first display 127 may output driving information, operation information related to at least one function, and notification information related to a drowsy driving, as an image.

The image related to the drowsy driving may be a predetermined warning text or an image of an emoticon, wherein the warning text or the emoticon may be selected by a user.

The first display 127 may include a warning lamp, wherein the warning lamp may be turned on or off based on the command of the first controller 150.

The first display 127 may include a light emitting diode (LED) or a liquid crystal diode (LCD) provided in the cluster 123, a display, e.g. LCD, provided in the head unit, a head up display (HUD) projected to the window glass, and a display panel of the vehicle terminal 130.

The first display 127 may display an operation mode of the wearable device configured to perform a communication.

Based on a command of the first controller 150, the first sound device 128 may output driving information, operation information related to at least one function, and notification information related to a drowsy driving, as a sound.

The sound related to the drowsy driving may be a predetermined sound or a sound selected by a user.

The first sound device 128 may display an operation mode of the wearable device configured to perform a communication, as a sound.

The first sound device 128 may be a speaker provided in the vehicle or in the vehicle terminal 130.

The vehicle terminal 130 may output an image corresponding to at least one function that is selected by a user.

The vehicle terminal 130 may output information related to a drowsy driving.

The vehicle terminal 130 may be a navigation system configured to perform a navigation function.

That is, the vehicle terminal 130, i.e. the navigation system may perform a communication with a receiver to recognize a current position of a vehicle based on GPS information that is received from the receiver, and then display the current position that is matched on stored map information.

When a destination is input, the navigation system may guide a route from the current position to the destination.

The navigation system may determine whether the current position is a highway based on the verified current position and the map information, and when it is determined that the current position is the highway, the navigation system may transmit entry information indicating that the current position is the highway to the first controller 150. In addition, when it is determined that the vehicle is escaped from the highway, the navigation system may transmit escape information indicating that the current position is escaped from the highway to the first controller 150.

That is, when it is determined that the vehicle enters the highway, the navigation system 130 may transmit activation information of the drowsy driving prevention function to the first controller 150, and when it is determined that the vehicle is escaped from a highway, the navigation system 130 may transmit inactivation information of the drowsy driving prevention function to the first controller 150.

The first detector 140 may detect driving information of the vehicle and operation information of steering wheel.

The first detector 140 may be a sensor configured to detect driving information of vehicle, and the first detector 140 may include a wheel speed sensor configured to detect a driving speed of vehicle or an acceleration sensor configured to detect a driving acceleration of vehicle.

The first detector 140 may include a steering angle sensor configured to detect a rotation of a steering wheel of the vehicle among the operation information of the steering wheel, and a pressure sensor provided in a steering wheel to detect a pressure applied to the steering wheel.

When a command for pairing with the wearable device 2 is received from the first input 126, the first controller 150 may perform a pairing with the wearable device 2, and when the pairing with the wearable device 2 is successfully completed, the first controller 150 may store identification information of the paired wearable device 2 in the first storage 152.

When a command for communication with the wearable device 2 is received via the first input 126, the first controller 150 may search a paired wearable device, and when the paired wearable device is searched, the first controller 150 may perform a communication with the searched wearable device 2.

When the wearable device 2 is connected via the communication, the first controller 150 may determine whether the vehicle is in a driving status based on a vehicle's speed, and when the vehicle is in the driving status, the first controller 150 may transmit a power save mode command to the wearable device 2. In addition, when the vehicle is in a parking and stopping status, the first controller 150 may transmit a normal mode command to the wearable device.

In addition, the first controller 150 may transmit information related to a driving speed of the vehicle to the wearable device 2 to control the power save mode or the normal mode in the wearable device 2.

The first controller 150 may allow information related to an operation mode of the wearable device 2 to be outputted via at least one of the first display and the first sound device.

A result of this, a user may easily recognize an operation status of the wearable device.

When a command for performing a navigation function is received from the first input 126, the first controller 150 may activate an operation of the navigation system 130 to allow the navigation function to be performed in the navigation system 130.

When the detected vehicle's speed is faster than a reference speed, the first controller 150 may automatically operate the drowsy driving prevention function.

In addition, when a command for performing a drowsy driving prevention function is received from the first input 126, the first controller 150 may operate the drowsy driving prevention function.

When the drowsy driving prevention function is operated, the first controller 150 may perform a communication with the navigation system 130, and receive information related to a current position from the navigation system 130.

The information related to a current position may be predetermined information indicating that a current position is a highway. For example, the predetermined information may be activation information of the drowsy driving prevention function.

In a state in which the drowsy driving prevention function is operated, when the navigation system 130 is turned off, the first controller 150 may activate the operation of the navigation system 130.

When the current position of the vehicle is a highway, the first controller 150 may confirm a pressure of the steering wheel 124 and a rotation angle of the steering wheel 124, which are detected by the first detector 140. When the pressure of the steering wheel 124 is less than a reference pressure and the rotation angle of the steering wheel 124 is less than the reference angle, the first controller 150 may firstly determine that current driving is drowsy driving, and then transmit first determination information related to the drowsy driving to the wearable device 2.

When the first controller 150 verifies whether the rotation angle of the steering wheel is less than the reference angle, the first controller 150 may verify whether the rotation angle of the steering wheel, which changes as time passes, is changed to below the reference angle.

When the rotation angle of the steering wheel exceeds the reference angle or the pressure applied to the steering wheel exceeds the reference pressure and the rotation angle, the first controller 150 may determine that current driving is not drowsy driving.

When the drowsy driving prevention function is performed, the first controller 150 may firstly determine whether current driving is a drowsy driving at a reference time interval. The reference time interval may be approximately 30 minutes.

When second determination information is received from the wearable device 2, the first controller 150 may control outputting notification information related to the drowsy driving by controlling at least one of the first display 127 and the first sound device 128.

In a state in which the notification information related to the drowsy driving is outputted, the first controller 150 may determine whether the second determination information related to the drowsy driving is received from the wearable device 2, again, and when the second determination information is received again, the first controller 150 may output the notification information again.

When the second determination information related to the drowsy driving is received from the wearable device 2, the first controller 150 may verify information related to a rest area, based on navigation information of the navigation system 130 (current position and map information), and then control outputting the verified information.

When the first controller 150 verifies whether the second determination information is re-received, the first controller 150 may temporarily stop an operation for determining whether current driving is a drowsy driving based on the current position of the vehicle and the operation information of the steering wheel.

In a state in which the first controller 150 transmits the first determination information to the wearable device 2, the first controller 150 may determine whether a predetermined time is expired, and when it is determined that the second determination information related to the drowsy driving is not received from the wearable device 2 within the predetermined time, the first controller 150 may ignore the first determination information and then determine whether current driving is a drowsy driving based on the current position of the vehicle and the operation information of the steering wheel, again.

The first communicator 151 may include a receiver and perform a communication with a plurality of satellites to acquire GPS information so as to identify the current position of the vehicle.

The first communicator 151 may perform a communication with a wearable device, and transmit and receive information to and from the wearable device.

With a wearable device, the first communicator 151 may perform at least one communication of a bluetooth communication, a USB communication, and a WiFi communication.

The first storage 152 may store identification information of a paired wearable device, sound information and display information, which are notifications of information related to a drowsy driving, and reference information to determine whether current driving is a drowsy driving.

The reference information may include a reference pressure applied to a steering wheel, a reference angle in which a steering wheel is operated, and a reference time related to an interval to determine whether it is a drowsy driving.

The first storage 152 may store a reference speed of a vehicle for automatically operating the drowsy driving prevention function.

The first storage 152 may store position information of a highway.

The first controller 150 of the vehicle may determine whether the vehicle is on a highway by using GPS information received from the receiver without the navigation information of the navigation system 130.

The vehicle 1 may further include the lane departure warning system 160 configured to recognize a lane line that is adjacent to the vehicle with reference to a lane where the vehicle is located.

The lane departure warning system 160 may include the imager 161, the first recognizer 162 and the second recognizer 163.

The imager 161 may be provided in a front side of the vehicle, and may include a camera configured to collect an image acquired from a road in the front and the left and right side of the vehicle.

The first recognizer 162 may recognize a lane and a lane line of the vehicle based on the image collected by the imager 161.

The second recognizer 163 may detect whether the turn signal lamp is turned on or off.

The second recognizer 163 may detect whether the left turn signal lamp of the vehicle is turned on or the right turn signal lamp of the vehicle is turned on.

In addition, the second recognizer 163 may detect an operation of a direction indicator lever (not shown) configured to turn on and turn off the left turn signal lamp or the right turn signal lamp so that the second recognizer 163 detects whether the left turn signal lamp of the vehicle is turned on or the right turn signal lamp of the vehicle is turned on.

Hereinafter a description of the first determination of the first controller 150 when the lane departure warning system 160 is provided in the vehicle will be described.

When a command for operating a lane departure detection function is received from the first input 126, the first controller 150 may allow the lane departure detection function to be operated by activating the imager 161, the first recognizer 162 and the second recognizer 163, and when the lane departure is detected, the first controller 150 may control outputting warning information related to the lane departure.

The first controller 150 may confirm the lane information detected by the first recognizer 162. When it is determined that the vehicle is not placed in a lane of the vehicle, but in a lane line adjacent to the lane of the vehicle, the first controller 150 may detect whether the turn signal lamp is turned on, which is detected by the second recognizer 163. When it is determined that the turn signal lamp is turned off, the first controller 150 may determine that the vehicle is away from the lane. When it is determined that the turn signal lamp is turned on, the first controller 150 may determine that current driving is a normal driving.

When it is determined that the vehicle is placed in a lane line adjacent to the lane of the vehicle, the first controller 150 may determine whether the lane line is a left line or a right line with reference to the lane of the vehicle. As a result of the determination, when it is determined that it is the left line, the first controller 150 may determine whether the left turn signal lamp is turned on, and when it is determined that it is the right line, the first controller 150 may determine whether the right turn signal lamp is turned on.

When the command for performing the drowsy driving prevention function is received, the first controller 150 may detect the lane departure by activating an operation of the imager 161, the first recognizer 162, and the second recognizer 163. When a current position of the vehicle is a highway, the first controller 150 may detect whether the vehicle is away from, or out of, the lane. As a result of the detection, when it is determined that the vehicle is away from, or out of, the lane, the first controller 150 may confirm a pressure of the steering wheel 124 and a rotation angle of the steering wheel 124 using the first detector 140. When the pressure of the steering wheel 124 is less than the reference pressure and the rotation angle of the steering wheel 124 is less than the reference angle, the first controller 150 may firstly determine that current driving is a drowsy driving, and then transmit first determination information related to the drowsy driving to the wearable device 2.

When the first controller 150 verifies whether the rotation angle of the steering wheel is less than the reference angle, the first controller 150 may verify whether the rotation angle of the steering wheel, which changes as time passes, is changed to below the reference angle.

When the drowsy driving prevention function is performed, the first controller 150 may firstly determine whether current driving is a drowsy driving at a reference time interval. The reference time interval may be approximately 30 minutes.

The first controller 150 may transmit information related to a drowsy driving to another vehicle when performing a communication with an adjacent other vehicle, and may open a window glass provided in the vehicle.

Figure 5:
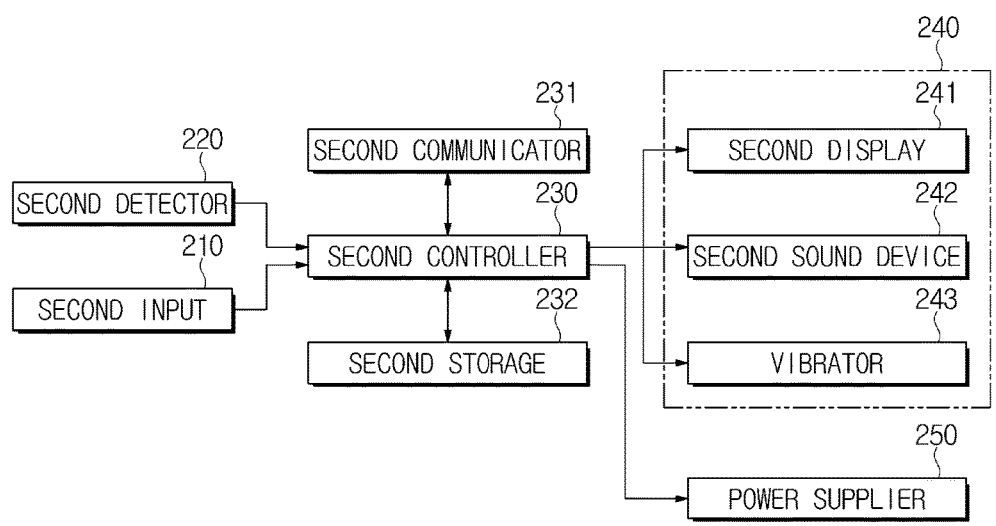
FIG. 5 is a control block diagram illustrating a wearable device in accordance with an embodiment of the present disclosure.

FIG. 5 is a control block diagram illustrating a wearable device in accordance with an embodiment of the present disclosure.

The wearable device 2 may include a second input 210; a second detector 220; a second controller 230; a second communicator 231; a second storage 232; an output unit 240 and a power supplier 250.

The second input 210 may receive an operation command of at least one function among a plurality of functions.

The second input 210 may receive a command for pairing with a vehicle, a command for performing a drowsy driving prevention function and a driving mode of a vehicle.

The second input 210 may include a touch panel and a physical button.

The touch panel may be provided in the user interface of the body of the wearable device, and the physical button may be provided in the body of the wearable device.

The second detector 220 may detect a user's biological information.

The biological information may include user's movement information, and biological response information that is generated from a user's body when a user drives the vehicle while drowsy.

The second detector 220 may include a motion sensor configured to detect a user's movement and a biological sensor configured to detect biological response related to a user's drowsiness.

The motion sensor may include at least one of an acceleration sensor, a gravity sensor and a gyro sensor, and the biological sensor may include a pulse sensor (or a heart rate sensor) to detect a user's pulse, or an electromyography (EMG) sensor to detect user's electromyography.

The pulse sensor may include an optical sensor, an electrode sensor or an acceleration sensor.

The optical sensor emits a light to the wrist by using an LED having a certain frequency spectrum (i.e. infrared), and outputs a reflection signal that is incident to a photo transistor.

The electrode sensor outputs a signal in response to changes in the human body potential generated in the electrode adjacent to the wrist.

The acceleration sensor outputs a signal about ballistocardiogram (BCG) that is, or corresponds to or is influenced by, a movement of the wrist according to a physical movement of the heart.

The EMG sensor may include an electrode, and output a signal about the action potential of the muscle that is generated in the muscle around the wrist by using the electrodes.

The second controller 230 may control an operation of the function of the wearable device 2.

For example, the function of the wearable device 2 may include a phone call function, transmission and reception text (SMS) function, amount of activity check function, drowsy driving determination function, SNS function, Internet search function, audio function and radio function.

When the command for pairing with the vehicle is input, the second controller 230 may control pairing with the vehicle 1, and when the pairing with the vehicle 1 is completed, the second controller 230 may store identification information of the paired vehicle in the second storage 232.

When an operation mode of the wearable device 2 is the normal mode, the second controller 230 may control an operation of a second display 241, a second sound device 242 and a vibrator 243, based on information detected by the second detector.

For example, the second controller 230 may determine whether the arm is moved toward a user's face, based on arm movement information during the normal mode. When it is determined that the movement is moving toward the user's face, the second controller 230 may control the second display 241 to allow a current time to be displayed on the second display 241.

In addition, during the normal mode, the second controller 230 may convert an analog signal that is an output signal of the second detector 220 into a digital signal, check an amount of user's activity in real time and store the amount in the second storage 232. In addition, the second controller 230 may display the amount of activity information on the second display at a predetermined period.

When a command for displaying an amount of activity is input to the second input 210, the second controller 230 may display the amount of activity information that is stored in the second storage on the second display.

When the vehicle speed information is received via the second communicator 231 or a driving mode is input via the second input 210, the second controller 230 may perform the power save mode and activate only the communication function.

When the wearable device automatically communicates with the vehicle, the second controller 230 may perform the power save mode.

Performing the power save mode may include inactivating an operation of the second detector 220 and the second display 241.

That is, the second controller 230 may control the power supplier 250 so that the power supplier 250 may selectively block the power that is supplied to each component according to whether an operation mode of the wearable device is the normal mode or the power save mode.

During the power save mode, when the first determination information is received via the second communicator 231, the second controller 230 may convert the power save mode into the normal mode, activate the second detector 220, and secondly determine whether current driving is drowsy driving, based on information detected by the biological sensor of the second detector.

When it is determined that current driving is drowsy driving, the second controller 230 may transmit the second determination information to the vehicle 1, and control the output unit 240 so that the output unit 240 outputs notification information related to the drowsy driving.

Controlling the output unit 240 may include at least one of displaying the notification information on the second display 241, outputting warning sound via the second sound device 242 and generating a vibration via the vibrator 243.

When it is secondly determined that current driving is the drowsy driving, the second controller 230 may repeatedly re-determine whether current driving is a drowsy driving based on the signal output from the biological sensor at a reference time interval.

When it is re-determined that current driving is the drowsy driving, the second controller 230 may transmit the second determination information to the vehicle 1, again, and control the output unit 240 again so that the output unit 240 outputs the notification information related to the drowsy driving, again.

When it is not re-determined that current driving is the drowsy driving, the second controller 230 may perform the power save mode and activate only the communication function.

When it is secondly determined that current driving is the drowsy driving, the second controller 230 may send text information about a user's drowsy driving to a pre-registered phone number.

As is apparent from the above description, it may be possible to minimize the power consumption in the wearable device, and it may be possible to improve the accuracy of determination of drowsy driving and to minimize the risk of an adverse event caused by the drowsy driving.

A configuration in which the second controller 230 secondly determines a drowsy driving will be described in details.

The second controller 230 may extract heart rate variability (HRV) signal that is detected by the pulse sensor, and perform a frequency analysis. Accordingly, the second controller 230 may separate pulses according to frequency bands.

That is, the second controller 230 may perform a power spectrum analysis on HRV signal to acquire a signal according to frequency characteristics.

When performing the power spectrum analysis on HRV signal, the analyzed signal may be divided into a low frequency (L/F) component of less than 0.05 Hz, a middle frequency (M/F) component from 0.05 to 0.15 Hz, and a high frequency (H/F) component of more than 0.15 Hz, according to the frequency band.

The low frequency (UF) component may be related to regulation of body temperature, the middle frequency (M/F) component may be related to sympathetic nerve, and the high frequency (H/F) component may be related to parasympathetic nerve.

Therefore, when the high frequency (H/F) component is increased as a pulse detected is reduced, the second controller 230 may determine that a user is driving while drowsy.

The second controller 230 may examine an effectiveness of EMG signal to analyze an EMG signal that is transmitted from the EMG sensor. That is, the second controller 230 may confirm whether the EMG signal indicates a user's drowsy state by confirming whether the EMG signal has a variation of more than a predetermined reference amount. When it is determined that the user is driving in the drowsy state, the second controller 230 may secondly determine that current driving is a drowsy driving.

In addition, the predetermined reference may be acquired by learning an EMG signal via a neural network algorithm. The neural network learning may represent a process of appropriately setting a weight value so that a node of a desired result has a maximum value.

For example, the EMG signal may output determination criteria in a drowsy status about a wrist's stiffness and a muscle fatigue, as a result by using a neural network algorism.

The second communicator 231 may perform a communication with the vehicle and an external device.

The second communicator 231 may perform a wireless communication, e.g. WiFi communication and bluetooth communication, and a wired communication, e.g. USB terminal communication.

The second communicator 231 may perform at least one of 2G, 3G, 4G and 5G communication.

The second storage 232 may store a signal according to frequency characteristic or an EMG signal to determine a drowsy driving.

The second storage 232 may store identification information of a paired vehicle.

The second storage 232 may store a phone number to contact when a driver drives while drowsy.

The output unit 240 may include the second display 241, the second sound device 242 and the vibrator 243, which are configured to output operation information of the wearable device, based on a command of the second controller.

The second display 241 may output information related to a function that is performed in the wearable device, as an image.

The second display 241 may display mode conversion information related to converting into a normal mode when the first determination information is received, and the second display 241 may output notification information related to the drowsy driving that is secondly determined, as an image.

When the power save mode is performed, the second display 241 may turn off a screen and when the normal mode is performed, the second display 241 may turn on the screen.

The second display 241 may include a display panel.

The second display 241 may be implemented by a touch screen that is integrally formed with the second input 210.

The second sound device 242 may output information related to a function that is performed in the wearable device, as a sound.

The second sound device 242 may output notification information related to the drowsy driving that is secondly determined, as a sound.

The second sound device 242 may output mode conversion information related to converting into a normal mode when the first determination information is received.

In a vibration mode, the vibrator 243 may generate a vibration when receiving a phone call.

The vibrator 243 may generate a vibration when it is secondly determined that current driving is a drowsy driving.

The power supplier 250 may selectively supply the power that is needed for an operation of the each component of the wearable device, according to the control of the second controller 230.

For example, when the wearable device is in the power save mode, the power supplier 250 may supply the power to only the second controller and the second communicator while not supplying the power to the second storage, the second detector, and the second display. When the wearable device is in the normal mode, the power supplier 250 may supply the power to each component.

In the power save mode, the power supplier 250 may supply the power to the second input to allow the wearable device to be operated in response to a user's requirement.

The power supplier 250 may include a battery, wherein the battery may be an embedded battery configured to be rechargeable.

In addition, the power supplier 250 may include a connection port, wherein the connection port may be electrically connected to an external charger, which is configured to supply a power, to charge the battery.

For another example, the power supplier 250 may be configured to be chargeable by using a wireless charging method, without using a connection port. In this case, the power supplier 250 may receive the power by using at least one of an inductive coupling method based on the magnetic induction from the external wireless power transmission device or a magnetic resonance coupling method based on electromagnetic Resonance.

Figure 6:
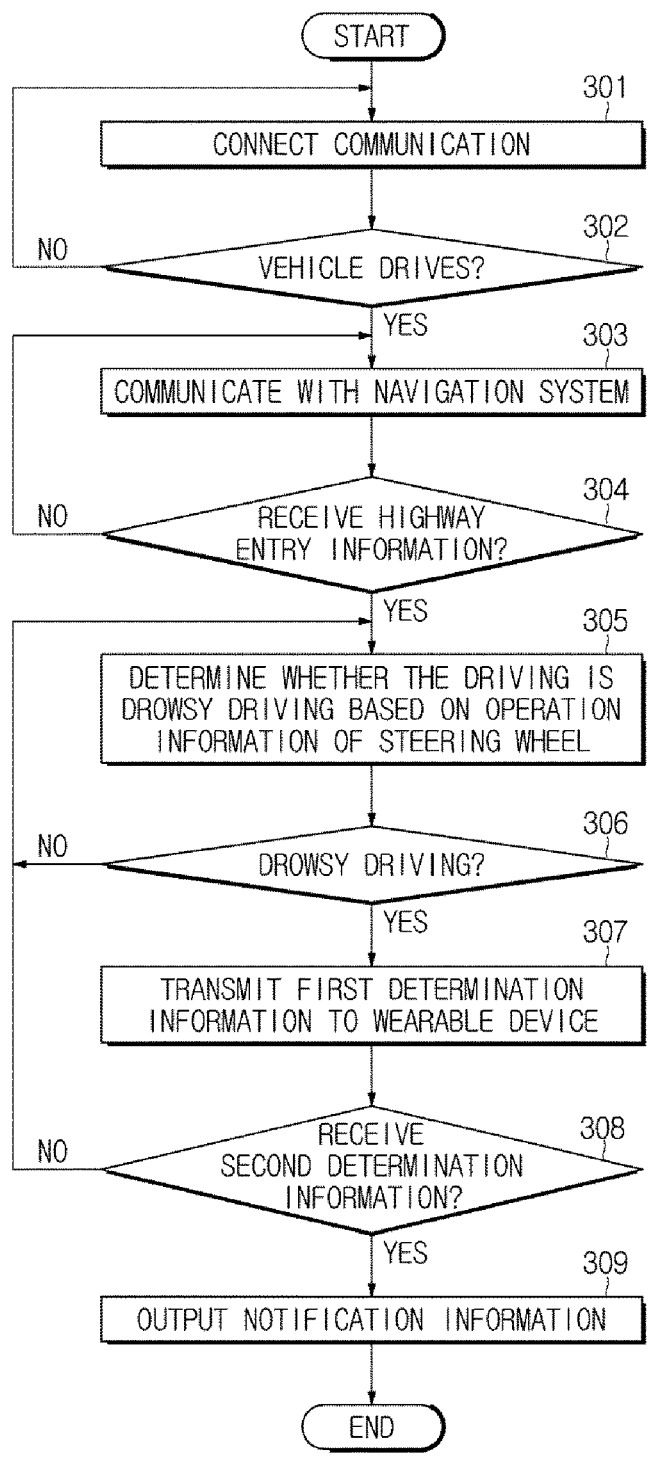
FIG. 6 is a control flowchart of a vehicle communicating with a wearable device in accordance with an embodiment of the present disclosure.

FIG. 6 is a control flowchart of a vehicle communicating with a wearable device in accordance with an embodiment of the present disclosure.

When a command for communicating with a wearable device is input via the first input 126, the vehicle may search a paired wearable device and allow a communication to be performed with the searched wearable device (301).

The vehicle may determine whether the vehicle is a driving status or a parking and stopping status based on the detected vehicle speed information (302), and when it is determined that the vehicle is in the driving status, the vehicle may transmit a command for a power save mode to the wearable device.

Alternatively, by directly transmitting the vehicle speed information to the wearable device, the vehicle may control the wearable device so that the wearable device converts into the power save mode based on the vehicle speed information.

When the vehicle is in the driving status, the vehicle may perform a communication with the navigation system (303), determine whether information related to entry to a highway is received from the navigation system (304), and when it is determined that information related to entry to a highway is received, the vehicle may determine whether current driving is a drowsy driving based on operation information of the steering wheel detected by the first detector (305).

In addition, when only a receiver is provided in the vehicle without the navigation system, the vehicle may determine whether a current position of the vehicle is a highway by comparing GPS information received via the receiver, with position information of the highway stored in the first storage 132.

One example of determining whether current driving is a drowsy driving may include, when the current position of the vehicle is the highway, confirming a pressure of the steering wheel 124 and a rotation angle of the steering wheel 124, which are detected by the first detector 140, and determining whether the pressure of the steering wheel is less than a reference pressure. When the pressure of the steering wheel 124 is less than the reference pressure, determining whether the variation of the rotation angle of the steering wheel according to the time change is changed to be below the reference angle.

That is, when the pressure of the steering wheel 124 is less than the reference pressure and the variation of the rotation angle of the steering wheel 124 according to the time change is less than the reference angle, the vehicle may firstly determine that current driving is a drowsy driving (306), and then transmit first determination information related to the drowsy driving to the wearable device 2 (307).

Another example of determining whether current driving is a drowsy driving may include, when the current position of the vehicle is the highway, recognizing a lane and a lane line of the vehicle based on an image collected by the imager 161, detecting whether the left turn signal lamp is turned on when it is determined that the vehicle is placed in a left lane line of the lane of the vehicle, and determining that current driving is not a drowsy driving when it is determined that the left turn signal lamp is turned on. In addition, the determination may include, when it is determined that the left turn signal lamp is turned off, confirming a pressure of the steering wheel 124 and a rotation angle of the steering wheel 124, which are detected by the first detector 140, determining whether the pressure of the steering wheel is less than the reference pressure, and determining whether the variation of the rotation angle of the steering wheel according to the time of change is changed to below the reference angle when the pressure of the steering wheel 124 is less than the reference pressure.

In addition, the determination may include detecting whether the right turn signal lamp is turned on when it is determined that the vehicle is placed in a right lane line of the lane of the vehicle, determining that current driving is not a drowsy driving when it is determined that the right turn signal lamp is turned on. In addition, the determination may include, when it is determined that the right turn signal lamp is turned off, confirming a pressure of the steering wheel 124 and a rotation angle of the steering wheel 124, which are detected by the first detector 140, determining whether the pressure of the steering wheel is less than the reference pressure, and determining whether the variation of the rotation angle of the steering wheel according to the time change is changed to below the reference angle when the pressure of the steering wheel 124 is less than the reference pressure.

That is, in a state in which the vehicle is placed on the lane line, when the turn signal lamp is turned off, the pressure of the steering wheel 124 is less than the reference pressure and the variation of the rotation angle of the steering wheel 124 according to the time of change is less than the reference angle, the vehicle may firstly determine that current driving is a drowsy driving (306), and then transmit first determination information related to the drowsy driving to the wearable device 2 (307).

In a state in which the second determination information related to the drowsy driving is not received from the wearable device when a predetermined time is expired after transmitting the first determination information to the wearable device 2, the vehicle may ignore the first determination information, and determine whether current driving is a drowsy driving at a predetermined time interval based on the current position of the vehicle and the operation information of the steering wheel.

In contrast, when the second determination information related to the drowsy driving is received from the wearable device 2 (308), the vehicle may control at least one of the first display 127 and the first sound device 128 to output notification information related to a drowsy driving (309).

In a state in which the vehicle outputs the notification information related to a drowsy driving, the vehicle may determine whether the second determination information related to the drowsy driving is received from the wearable device 2, again. When it is determined that the second determination information related to the drowsy driving is received again, the vehicle may output the notification information, again.

In addition, when determining whether the second determination information is re-received, the vehicle may temporarily stop an operation of determining whether current driving is a drowsy driving based on the current position of the vehicle and the operation information of the steering wheel.

Figure 7:
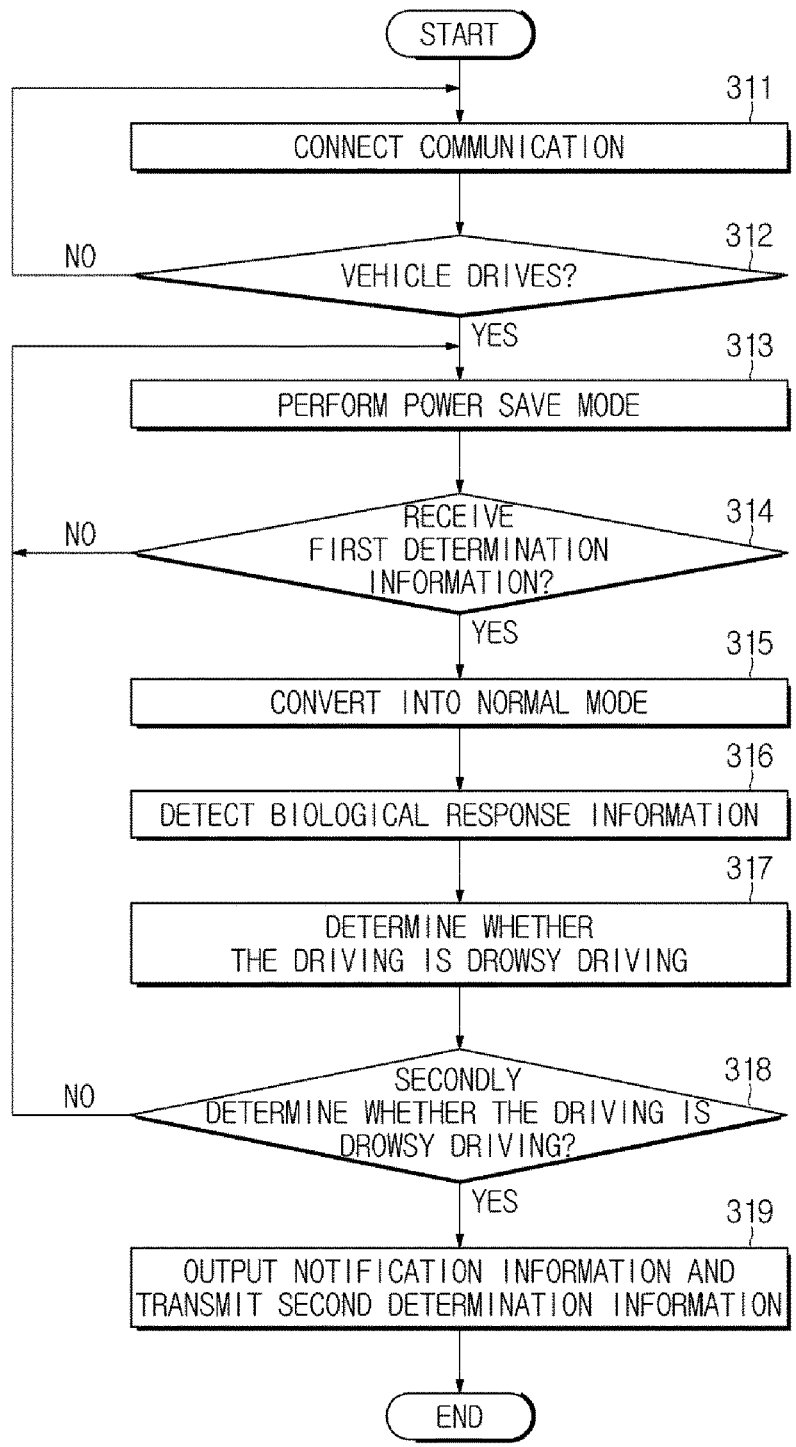
FIG. 7 is a control flowchart of a wearable device in accordance with an embodiment of the present disclosure.

FIG. 7 is a control flowchart of a wearable device in accordance with an embodiment of the present disclosure.

When an operation mode of the wearable device 2 is the normal mode, the wearable device 2 may control an operation of the second display 241, the second sound device 242 and the vibrator 243, based on information detected by the second detector 220.

For example, the wearable device may determine whether the arm is moved toward a user's face, based on arm movement information during the normal mode, and when it is determined that the movement is moving toward the user's face, the second controller 230 may control the second display 241 to allow a current time to be displayed on the second display 241.

In addition, during the normal mode, the wearable device may convert an analog signal that is an output signal of the second detector 220 into a digital signal, check an amount of user's activity in real time and store the amount in the second storage 232. In addition, the second controller 230 may display the amount of activity information on the second display at a predetermined period.

When a command for communicating with the vehicle is input, the wearable device perform a communication with the vehicle 1 (311), when the communication is connected to the vehicle, the wearable device may receive the vehicle driving speed information. In addition, the wearable device may determine whether the vehicle is in a driving status based on the received driving speed information (312), and when it is determined that the vehicle is in the driving status, the wearable device may perform the power save mode (313).

When the driving mode is input via the second input, the wearable device may perform the power save mode, and when the communication is connected to the vehicle, the wearable device may automatically perform the power save mode.

Performing the power save mode may include supplying the power to the second communicator 231 and the second controller 230 which are provided in the wearable device, and inactivating an operation of the second detector 220 and the second display 241 by blocking the power to the second detector 220 and the second display 241.

Before converting into the power save mode, the wearable device may display conversion information related to converting into the power save mode, via the second display, and when a certain time is expired after displaying the conversion information related to converting into the power save mode, the wearable device may inactivate the second display.

When the first notification information is received via the second communicator 231 during the power save mode (314), the wearable device may convert an operation mode into the normal mode (315), and the wearable device may detect user's biological response information by activating the second detector 220 by supplying the power to the second detector 220 (316).

When the mode is converted into the normal mode, the wearable device may display conversion information related to converting into the normal mode, via the second display by activating the second display, and may display detection performance information of the biological response information.

The wearable device may determine whether current driving is a drowsy driving based on the biological response information detected by the biological sensor of the second detector (317). When it is secondly determined that current driving is a drowsy driving, the wearable device may output notification information related to the drowsy driving and the wearable device may transmit the second determination information to the vehicle 1 (319).

Outputting the notification information may include at least one of displaying notification information as an image on the second display 241, outputting a warning sound via the second sound device 242 and generating a vibration via the vibrator 243.

According to an embodiment, the wearable device may shake off, or end, a user's drowsiness.

When it is secondly determined that current driving is a drowsy driving, the wearable device may repeatedly re-determine whether current driving is a drowsy driving at a reference time interval based on the biological response information output from the biological sensor.

When it is re-determined that current driving is a drowsy driving, the wearable device may transmit the second determination information to the vehicle 1, again, and control the output unit 240 again so that the output unit 240 outputs the notification information related to the drowsy driving, again.

When it is not re-determined that current driving is the drowsy driving, the wearable device may convert the mode into the power save mode and activate only the communication function.

As is apparent from the above description, it may be possible to minimize the power consumption in the wearable device, and it may be possible to improve the accuracy of determination of drowsy driving and to minimize the risk of an adverse event caused by the drowsy driving.

Figure 8:
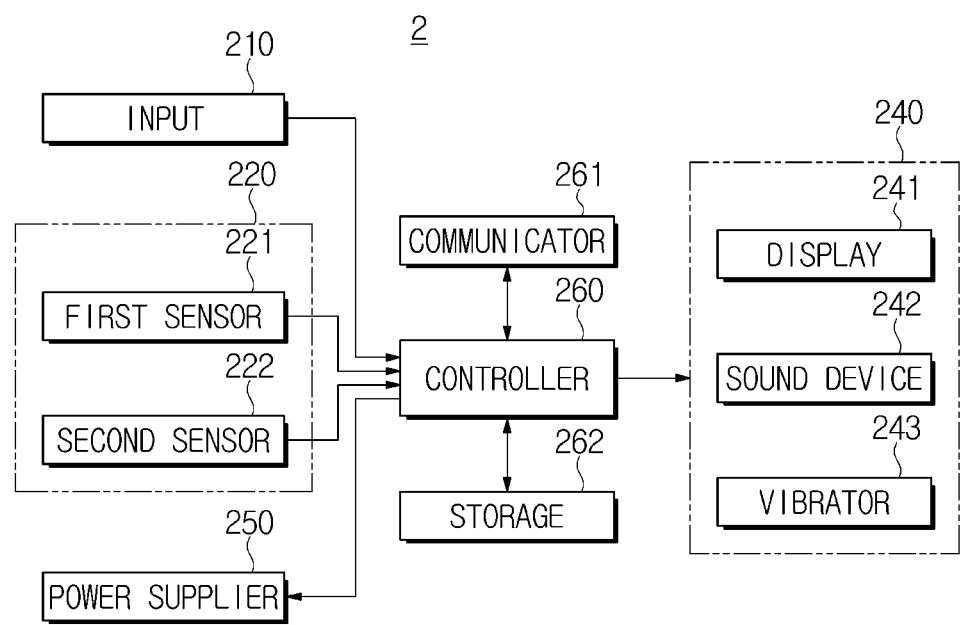
FIG. 8 is a control block diagram of a wearable device in accordance with another embodiment of the present disclosure.

FIG. 8 is a control block diagram of a wearable device in accordance with another embodiment of the present disclosure.

A wearable device 2 may include an input 210; a detector 220; a controller 260; a communicator 261; a storage 262; an output unit 240; and a power supplier 250.

The input 210, the output unit 240 and the power supplier 250 according to another embodiment may be the same as the second input 210, the output unit 240 and the power supplier 250 according to an embodiment, and thus a description thereof will be omitted, and described by the same reference numerals.

The detector 220 may include a first sensor 221 configured to detect user's movement information and a second sensor 222 configured to detect biological response information that is generated from a user's body when a user drives the vehicle while drowsy.

The first sensor 221 of the detector 220 may include a motion sensor configured to detect a user's movement.

The motion sensor may include at least one of an acceleration sensor, a gravity sensor and a gyro sensor.

The second sensor 222 may include a pulse sensor (or a heart rate sensor) to detect a user's pulse, or an electromyography (EMG) sensor to detect a user's electromyography.

The pulse sensor may include an optical sensor, an electrode sensor or an acceleration sensor.

The optical sensor emits a light to the wrist by using a LED having a certain frequency spectrum (i.e. infrared), and outputs a reflection signal that is incident to a photo transistor.

The electrode sensor outputs a signal in response to changes in the human body potential generated in the electrode adjacent to the wrist.

The acceleration sensor outputs a signal about ballistocardiogram (BCG) that is a movement of the wrist, or corresponds to or is influenced by a movement of the wrist, according to a physical movement of the heart.

The EMG sensor may include an electrode, and output a signal about the action potential of the muscle that is generated in the muscle around the wrist by using the electrodes.

The first sensor 221 of the detector unit may include a sensor configured to consume less power than the second sensor 222, when performing the detection.

The controller 260 may control an operation of the function of the wearable device 2.

For example, the function of the wearable device may include a phone call function, transmission and reception text (SMS) function, amount of activity check function, drowsy driving determination function, SNS function, Internet search function, audio function and radio function.

When an operation mode of the wearable device 2 is the normal mode, the controller 260 may control an operation of the display 241, the sound device 242, and the vibrator 243, based on information detected by the first sensor 221 and the second sensor 222 of the detector.

For example, the controller 260 may determine whether the arm is moved toward a user's face, based on arm movement information during the normal mode, and when it is determined that the movement is moving toward the user's face, the controller 260 may control the display 241 to allow a current time to be displayed on the display 241.

In addition, during the normal mode, the wearable device may convert an analog signal that is an output signal of the detector 220 into a digital signal, check an amount of user's activity in real time, and store the amount in the storage 262. In addition, the controller 260 may display the amount of activity information on the display 241 at a predetermined period.

When a command for displaying an amount of activity is input via the input 210, the controller 260 may display the amount of activity information stored in the storage 262, on the display 241.

The controller 260 may determine whether the vehicle drives based on hand movement information detected by the first sensor 221, and when it is determined that the vehicle drives, the controller 260 may perform the power save mode.

The determination of whether the vehicle drives may include determining whether hand movement information detected by the first sensor 221 corresponds to the rotation of the steering wheel when the vehicle drives.

The determination of whether the vehicle drives may further include determining whether hand movement information detected by the first sensor 221 corresponds to a grip motion of the steering wheel when the vehicle drives.

Movement information corresponding to the rotation motion and the grip motion of the steering wheel when the vehicle drives may be information acquired in advance by an experiment.

When a driving mode is input via the input 210, the controller 260 may perform the power save mode.

Performing the power save mode may include inactivating an operation of the second sensor 222 and the display 241.

That is, the controller 260 may control the power supplier 250 so that the power supplier 250 may selectively block the power that is supplied to each component according to whether an operation mode of the wearable device is the normal mode or the power save mode.

The controller 260 may firstly determine whether current driving is a drowsy driving based on movement information detected by the first sensor 221 during the power save mode, and when it is firstly determined that current driving is a drowsy driving, the controller 260 may convert the operation mode into the normal mode, activate the second sensor 222, and secondly determine whether current driving is a drowsy driving based on biological response information detected by the second sensor 222.

When it is secondly determined that current driving is the drowsy driving, the controller 260 may control the output unit 240 to allow the second determination information to be outputted.

Controlling the output unit 240 may include at least one of displaying the notification information on the display 241, outputting a warning sound via the sound device 242 and generating a vibration via the vibrator 243.

When it is secondly determined that current driving is the drowsy driving, the controller 260 may repeatedly re-determine whether current driving is a drowsy driving at a reference time interval based on the signal output from the biological sensor.

When it is re-determined that current driving is the drowsy driving, the controller 260 may control the output unit 240 again so that the output unit 240 outputs the notification information, again.

When it is re-determined that current driving is not the drowsy driving, the controller 260 may perform the power save mode and activate only the first sensor 221.

When it is secondly determined that current driving is the drowsy driving, the controller 260 may send text information about a user's drowsy driving to a pre-registered phone number.

As is apparent from the above description, it may be possible to minimize the power consumption in the wearable device, and it may be possible to improve the accuracy of determination of drowsy driving and to minimize the risk of an adverse event caused by the drowsy driving.

When position information of the highway is stored in the storage 262, the controller 260 may recognize a current position based on GPS information received via the receiver, and determine whether a current position is in the highway by comparing the recognized current position with position information of the highway. When it is determined that the current position is in the highway, the controller 260 may perform the drowsy driving prevention function.

Performing the drowsy driving prevention function may include firstly determining whether current driving is a drowsy driving by using the first sensor unit, and when it is determined that current driving is the drowsy driving, secondly determining whether current driving is a drowsy driving by using the second sensor unit.

The first determination of whether current is a drowsy driving by using the first sensor unit may further include determining whether a hand movement information detected by the first sensor 221 corresponds to the rotation motion and the grip motion of the steering wheel during the drowsy driving.

Movement information corresponding to the rotation motion and the grip motion of the steering wheel during the drowsy driving may be information acquired in advance by an experiment.

A configuration to secondly determine a drowsy driving based on the biological response information detected by the sensor unit may be the same as the configuration for the second determination of the drowsy driving according to an embodiment, and thus a description thereof will be omitted.

The communicator 261 may perform a wireless communication, e.g. WiFi communication and bluetooth communication, and a wired communication, e.g. USB terminal communication.

The communicator 261 may perform at least one of 2G, 3G, 4G and 5G communication.

The communicator 261 may further include a GPS receiver configured to receive GPS information by performing a communication with a plurality of satellites.

The storage 262 may store signals according to frequency characteristic or EMG signal of the EMG sensor to determine a drowsy driving.

The storage 262 may store position information of highway.

The storage 262 may store movement information of the first sensor 221 corresponding to the rotation motion and the grip motion of the steering wheel to determine whether the vehicle drives, and movement information of the second sensor 222 corresponding to the rotation motion and the grip motion of the steering wheel to determine whether current driving is a drowsy driving.

The storage 262 may store a phone number to contact when a driver drives while drowsy.

The power supplier 250 may selectively supply the power that is needed for an operation of the each component of the wearable device, according to the control of the controller 260.

That is, when the wearable device in the power save mode, the power supplier 250 may supply the power to only the controller 260, the first sensor 221, and the storage 262 while not supplying the power to the second sensor 222 and the display 241, and when the wearable device in the normal mode, the power supplier 250 may supply the power to each component.

Figure 9:
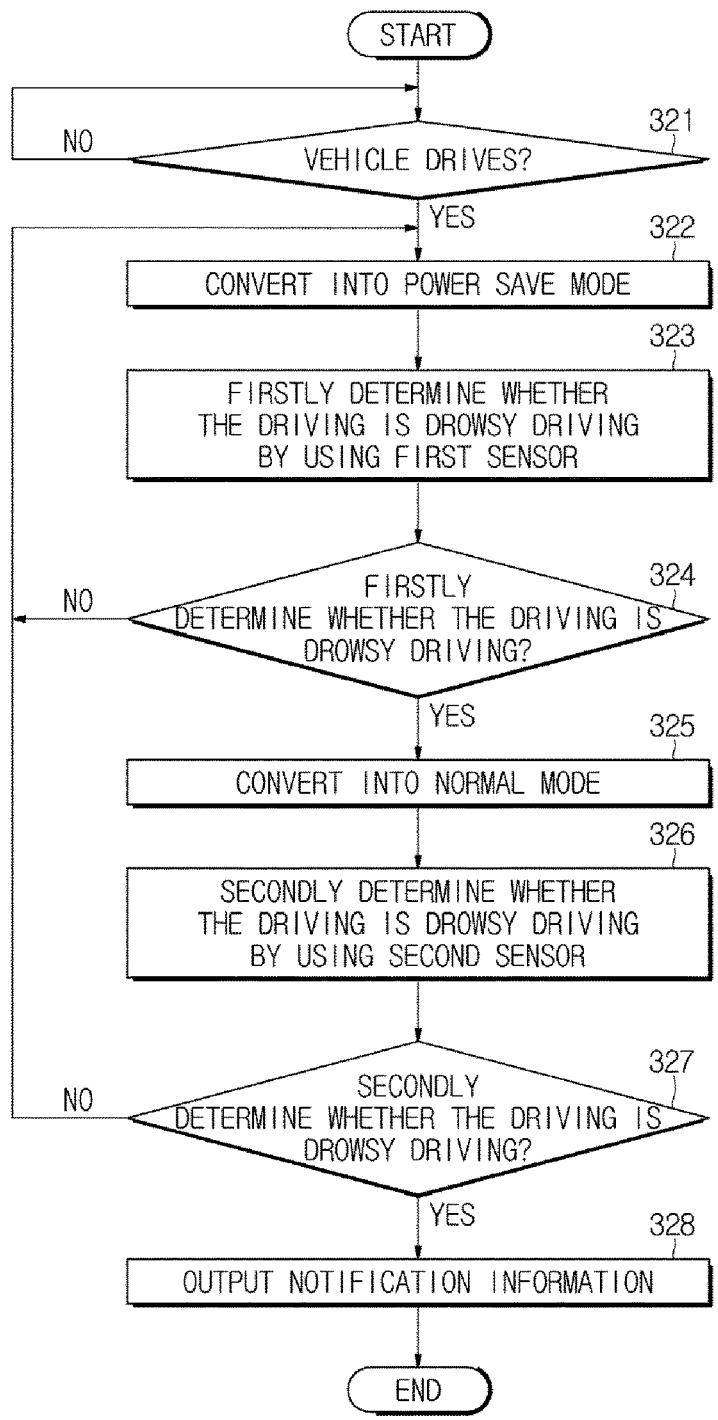
FIG. 9 is a control flowchart of a wearable device in accordance with another embodiment of the present disclosure.

FIG. 9 is a control flowchart of a wearable device in accordance with another embodiment of the present disclosure.

A control method of a wearable device in accordance with another embodiment is configured to perform a conversion of power save mode and a drowsy driving prevention function when it is impossible for the wearable device to communicate with a vehicle.

When an operation mode is a normal mode, the wearable device may control an operation of the display 241, the sound device 242 and the vibrator 243 based on information detected by the first sensor 221 and the second sensor 222 of the detector 220.

The wearable device may determine whether the vehicle drives based on movement information detected by the first sensor 221 (321), and when it is determined that the vehicle drives, the wearable device may convert into the power save mode (322).

When a driving mode is input via an input, the wearable device may perform the power save mode.

Performing the power save mode may include supplying the power to the first sensor 221, the storage 262, and the controller 260 which are provided in the wearable device, and inactivating an operation of the second sensor 222 and the display 241 by blocking the power to the second sensor 222 and the display 241.

Before converting the mode into the power save mode, the wearable device may display conversion information related to converting the mode into the power save mode, via the display 241, and when a certain time is expired after displaying the conversion information related to converting the mode into the power save mode, the wearable device may inactivate the display 241.

The wearable device 2 may determine whether current driving is a drowsy driving based on movement information detected by the first sensor unit during the power save mode (323). When it is firstly determined that current driving is the drowsy driving (324), the wearable device may convert an operation mode into the normal mode (325), and the wearable device may detect a user's biological response information by activating the second sensor 222 by supplying the power to the second sensor 222 to secondly determine whether current driving is a drowsy driving based on the detected biological response information (326).

When converting the operation mode into the normal mode, the wearable device may display conversion information related to converting the operation mode into the normal mode, via the display 241 by activating the display 241, and may display detection performance information of the biological response information.

When it is secondly determined that current driving is a drowsy driving (327), the wearable device may output notification information related to the drowsy driving (328).

The output of the notification information may include at least one of displaying notification information as an image on the display 241, outputting a warning sound via the sound device 242 and generating a vibration via the vibrator 243.

According to an embodiment, the wearable device may shake off, or end, a user's drowsiness.

When it is secondly determined that current driving is a drowsy driving, the wearable device may repeatedly re-determine whether current driving is a drowsy driving at a reference time interval based on the biological response information output from the biological sensor.

When it is re-determined that current driving is a drowsy driving, the wearable device may output the notification information related to the drowsy driving via the output unit 240, again.

When it is re-determined that current driving is not the drowsy driving, the wearable device may convert the operation mode into the power save mode and activate only the first sensor.

According to an embodiment, it may be possible to minimize the power consumption in the wearable device, and it may be possible to improve the accuracy of determination of drowsy driving and to minimize the risk of an adverse event caused by the drowsy driving.

As is apparent from the above description, according to the proposed wearable device, vehicle for communicating with the same, and method for controlling the same, it may be possible to allow the wearable device to be in a power save mode when the vehicle drives so that a display of the wearable device is prevented from being operated (i.e. a screen is turned on/off) such that a motion sensor is activated in response to an operation of a steering wheel of the vehicle.

Since a drowsy driving is secondly determined by operating the wearable device only when the vehicle firstly determines that current driving is a drowsy driving, the battery of the wearable device may be effectively used at determining the drowsy driving. Therefore, hours of use of the wearable device may be maximized.

Since whether current driving is a drowsy driving is secondly determined by interlocking the wearable device and the vehicle, a driver may safely drive the vehicle. Particularly, the driving safety may be improved by operating the drowsy driving prevention function in a dangerous highway section.

It may be possible to improve the quality and marketability of the vehicle capable of communicating with the wearable device, and further improve a user satisfaction. In addition, it may be possible to improve user convenience and the vehicle's safety and secure competitiveness of the vehicle.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A wearable device comprising:
  a communicator configured to perform a communication with a vehicle;
  a detector configured to detect a user's biological information; and
  a controller configured to perform a power save mode when vehicle speed information is received via the communicator, convert the power save mode into a normal mode when first determination information of drowsy driving is received via the communicator during the power save mode, secondly determine whether current driving is a drowsy driving based on the detected biological information during the normal mode, and when the drowsy driving is determined, allow second determination information of drowsy driving to be transmitted to the vehicle so that the second determining information is output from the vehicle,
  wherein the first determination information of drowsy driving is information transmitted from the vehicle.

2. The wearable device of claim 1, further comprising an output unit for outputting notification information related to a drowsy driving when the drowsy driving is determined.

3. The wearable device of claim 2, wherein the output unit comprises a display for outputting the notification information as an image, and a vibrator for generating a vibration when the drowsy driving is determined.

4. The wearable device of claim 2, further comprising a power supplier for supplying a power to the communicator, the detector, the controller and the output unit, wherein, during the power save mode, the controller controls the power supplier so that the power supplier supplies the power to the communicator and the controller, and during the normal mode, the controller controls the power supplier so that the power supplier supplies the power to the communicator, the detector, the controller and the output unit.

5. A wearable device comprising:
  a first sensor configured to detect a user arm's movement information;
  a second sensor configured to detect the user's biological response information;
  a controller configured to determine whether a vehicle drives or not based on movement information detected by the first sensor, perform a power save mode when it is determined that the vehicle drives, firstly determine whether current driving is a drowsy driving based on movement information detected by the first sensor during the power save mode, convert the power save mode into a normal mode when it is firstly determined that current driving is a drowsy driving, secondly determine whether current driving is a drowsy driving based on biological response information detected by the second sensor during the normal mode, and when the drowsy driving is determined, control outputting notification information, and allow second determination information of drowsy driving to be transmitted to the vehicle so that the second determining information is output from the vehicle; and an output unit configured to output the notification information.

6. The wearable device of claim 5, wherein the output unit comprises a display for outputting the notification information as an image, a sound device for outputting the notification information as a sound, and a vibrator for generating a vibration when it is secondly determined that current driving is a drowsy driving.

7. The wearable device of claim 5, further comprising a power supplier for supplying a power to the first sensor, the second sensor, the controller and the output unit, wherein during the power save mode, the controller controls the power supplier so that the power supplier supplies the power to the first sensor and the controller, and during the normal mode, the controller controls the power supplier so that the power supplier supplies the power to the first sensor, the second sensor, the controller and the output unit.

8. The wearable device of claim 5, further comprising a storage for storing movement information to determine whether the vehicle drives and movement information to determine whether current driving is a drowsy driving.

9. A vehicle comprising:
a communicator for performing a communication with a wearable device and a navigation system;
a detector for detecting operation information of a steering wheel; and
a controller for firstly determining whether current driving is a drowsy driving based on the operation information detected by the detector when it is determined that a current position is a highway based on information transmitted from the navigation system, and for allowing first determination information of drowsy driving to be transmitted to the wearable device when it is firstly determined that current driving is a drowsy driving; and
a display for outputting notification information,
wherein the controller controls outputting the notification information when second information of drowsy driving is received from the wearable device.

10. The vehicle of claim 9, further comprising a lane departure warning system for recognizing a lane departure, wherein the controller detects whether the vehicle is away from the lane or not when firstly determining whether current driving is a drowsy driving, for firstly determining that current driving is a drowsy driving when the vehicle is placed in a lane line adjacent to the lane of the vehicle, and for determining that current driving is not drowsy driving when the vehicle is placed in the lane of the vehicle.

11. The vehicle of claim 9, wherein the operation information comprises a pressure applied to the steering wheel and a rotation angle of the steering wheel, wherein the controller firstly determines that current driving is a drowsy driving when the pressure applied to the steering wheel is less than a reference pressure and the rotation angle of the steering wheel is less than a reference angle.

12. The vehicle of claim 9, wherein the detector further detects a driving speed, wherein the controller allows the detected driving speed information to be transmitted to the wearable device.

* * * * *